(12) United States Patent
Sakata

(10) Patent No.: US 8,867,998 B2
(45) Date of Patent: Oct. 21, 2014

(54) SHORT RANGE WIRELESS COMMUNICATION DEVICE

(75) Inventor: Ryuuji Sakata, Kariya (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 13/535,765

(22) Filed: Jun. 28, 2012

(65) Prior Publication Data

US 2013/0005262 A1    Jan. 3, 2013

(30) Foreign Application Priority Data

Jun. 30, 2011    (JP) ................................. 2011-145783

(51) Int. Cl.
*H04B 7/00* (2006.01)
*H04W 72/10* (2009.01)

(52) U.S. Cl.
CPC ..................................... *H04W 72/10* (2013.01)
USPC .......................................... 455/41.2; 455/39

(58) Field of Classification Search
USPC ..................... 455/41.2, 39, 569.1, 435.3, 512; 340/13.24
See application file for complete search history.

(56) References Cited

U.S. PATENT DOCUMENTS

| 7,468,963 | B2 * | 12/2008 | Capretta ........................ 370/329 |
| 8,179,856 | B2 * | 5/2012 | Kamata et al. ................ 370/330 |
| 8,369,903 | B2 * | 2/2013 | Saitoh et al. ............... 455/569.2 |
| 2008/0269961 | A1 | 10/2008 | Shitanaka et al. | |
| 2009/0032581 | A1 | 2/2009 | Esslinger et al. | |
| 2009/0253466 | A1 | 10/2009 | Saito et al. | |
| 2010/0197362 | A1 | 8/2010 | Saitoh et al. | |
| 2011/0237191 | A1 | 9/2011 | Saito et al. | |

FOREIGN PATENT DOCUMENTS

| JP | 2006-352522 | 12/2006 |
| JP | 2006-352799 | 12/2006 |
| JP | 2009-124463 | 6/2009 |
| JP | 2010-010876 | 1/2010 |
| JP | 2011-018975 | 1/2011 |

OTHER PUBLICATIONS

Office action dated Feb. 28, 2014 in corresponding Chinese Application No. 2012 1022 6263.5.
Office Action issued Apr. 16, 2013 in corresponding Japanese Application No. 2011-145783 with English translation.
Office Action issued Jul. 9, 2013 in corresponding Japanese Application No. 2011-145783 with English translation.

* cited by examiner

*Primary Examiner* — Sonny Trinh
(74) *Attorney, Agent, or Firm* — Harness, Dickey & Pierce, PLC

(57) ABSTRACT

A short range wireless communication device includes: a connection unit connectable with an external connection unit according to multiple data communication protocols defining data communication via a short range communication line covering a communication band; and a control unit that controls connection/disconnection of protocols. The protocols include high and low priority data communication protocols corresponding to high and low priority parts of the communication band, respectively. When a request for concurrently executing data communications under protocols is issued, the control unit preserves the high priority part of the communication band in priority to the low priority part of the communication band to execute high priority data communication under the high priority data communication protocol in priority to low priority data communication under the low priority data communication protocol.

11 Claims, 14 Drawing Sheets

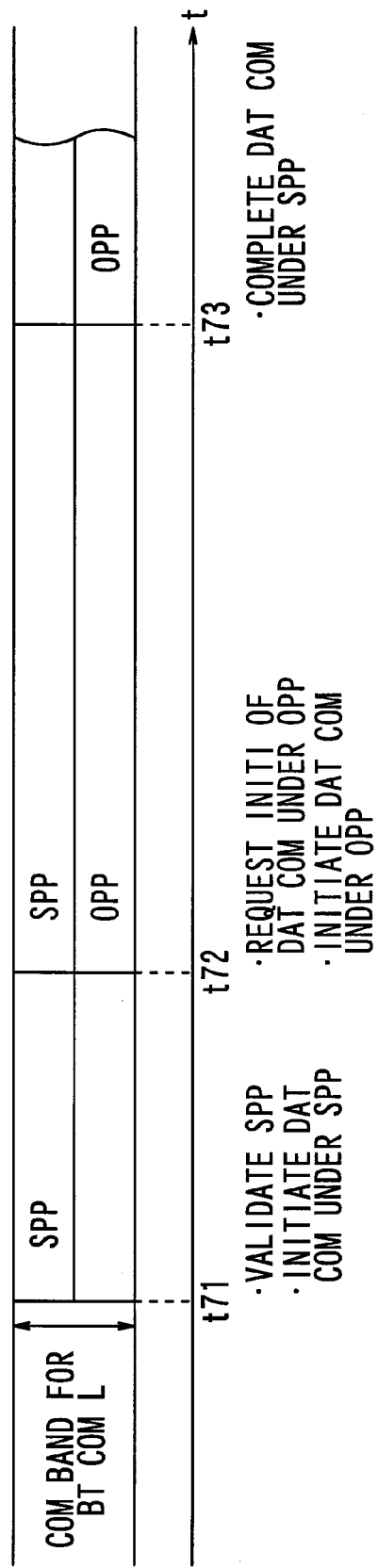

SHORT RANGE WIRELESS COMMUNICATION DEVICE

CROSS REFERENCE TO RELATED APPLICATION

This application is based on Japanese Patent Application No. 2011-145783 filed on Jun. 30, 2011, the disclosure of which is incorporated herein by reference.

TECHNICAL FIELD

The present disclosure relates to a short range wireless communication device including a connection unit that can concurrently validate plural data communications protocols, which define data communications, with respect to a communication-party connection unit while connecting a short range communication line, which covers a predetermined communication band, with the communication-party connection unit.

BACKGROUND

A short range communication module included in a short range communication device having a short range communication feature can concurrently validate plural data communications protocols, which define data communications, with respect to a short range communication module of a communication-party device (can make so-called multiple connections) (refer to, for example, patent documents 1 to 3 (JP-A-2008-273370, JP-A-2009-253601, and JP-A-2009-253603)).

By the way, when plural data communications protocols are concurrently validated with respect to a short range communication module of a communication-party device, data communications under the plural data communications protocols may compete with one another. However, since a communication band for a short range communication line is finite, when the data communications under the plural data communications protocols are concurrently executed, the finite communication band has to be divided and occupied among the data communications under the plural data communications protocols. Since the communication band is divided and occupied, data transmission speeds exerted in the respective data communications are decreased.

Under the circumstances, when data communications under plural data communications protocols compete with one another, how to control the data communications under the plural data communications protocols is controversial. Supposing that data communication which a user does not want to prioritize is executed in preference to data communication which the user wants to prioritize, such a problem arises that a period elapsing until a response to a user manipulation is presented, a period elapsing until call termination at a communication-party device over a communication network is notified, or a period elapsing until the communication-party device completes a connection onto the communication network gets longer.

SUMMARY

It is an object of the present disclosure to provide a short range wireless communication device capable of, when data communications under plural mutually different data communications protocols compete with one another, effectively executing the data communications under the plural data communications protocols.

According to an aspect of the present disclosure, a short range wireless communication device includes: a connection unit that is concurrently connectable with an external connection unit according to a plurality of data communication protocols, each of which defines data communication under a condition that the connection unit connects with the external connection unit via a short range communication line covering a predetermined communication band; and a control unit that controls connection and disconnection of each of the data communication protocols between the connection unit and the external connection unit, and controls a part of the communication band in the short range communication line to be occupied by data communication under a corresponding data communication protocol. The plurality of data communication protocols includes a high priority data communication protocol corresponding to a high priority part of the communication band in the short range communication line and a low priority data communication protocol corresponding to a low priority part of the communication band in the short range communication line. When a request for concurrently executing data communications under the plurality of data communication protocols is issued, the control unit preserves the high priority part of the communication band in priority to the low priority part of the communication band so that the control unit executes high priority data communication under the high priority data communication protocol in priority to low priority data communication under the low priority data communication protocol.

In the above device, even when data communications under plural mutually different data communications protocols compete with one another, priorities are set for the plural mutually different data communications protocols. Data communication under a data communications protocol having a higher priority is executed in preference to data communication under a data communications protocol having a lower priority. Thus, the data communications under the plural mutually different data communications protocols can be effectively executed.

BRIEF DESCRIPTION OF THE DRAWINGS

The above and other objects, features and advantages of the present disclosure will become more apparent from the following detailed description made with reference to the accompanying drawings. In the drawings:

FIG. 14 is a diagram showing another transition of a communication band for a Bluetooth communication line.

DETAILED DESCRIPTION

Figure 1:
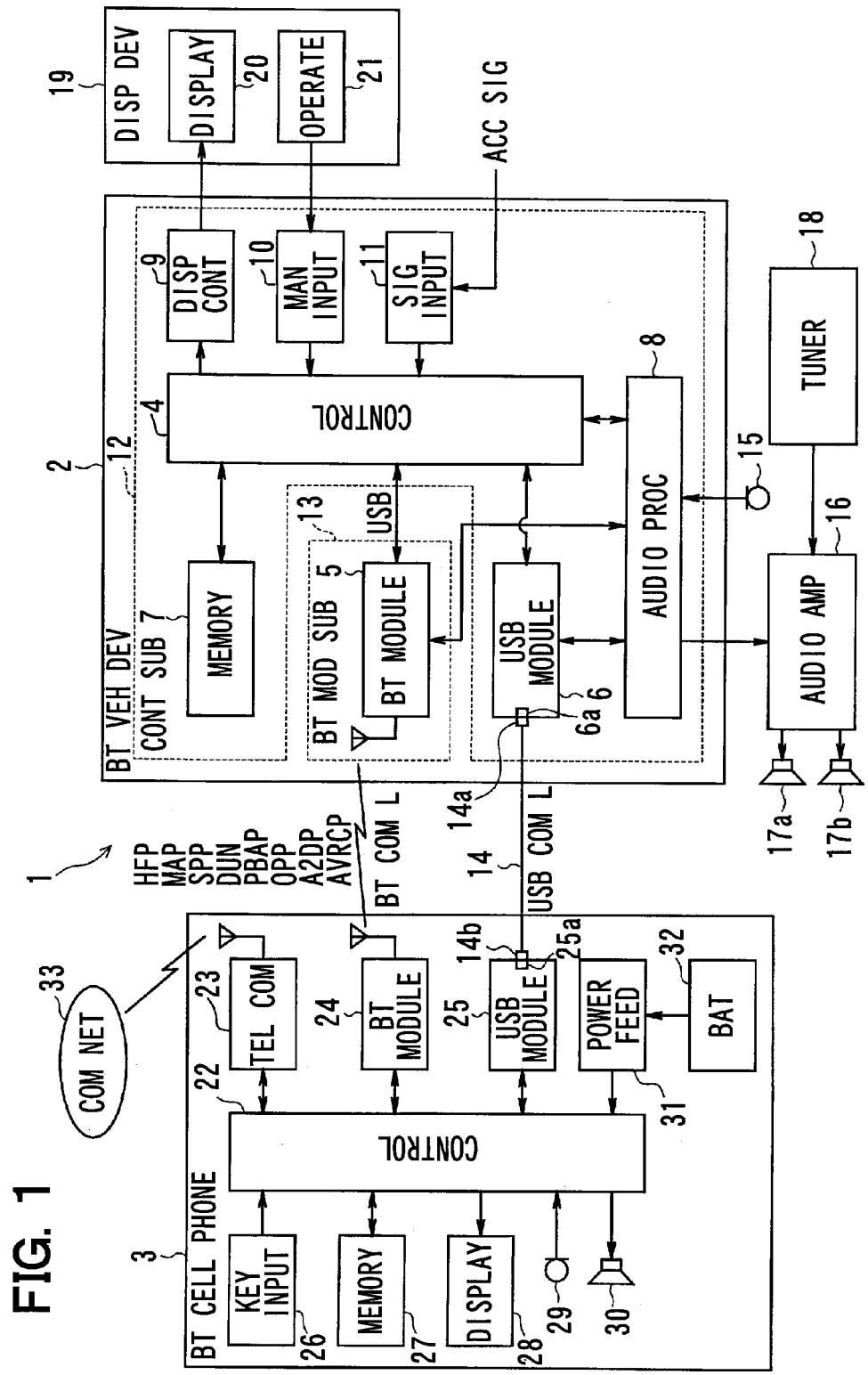
FIG. 1 is a functional block diagram showing a system of the present disclosure.

Referring to the drawings, an embodiment in which the present disclosure is adapted to a Bluetooth-compatible onboard device (hereinafter, simply, an onboard device) that has a Bluetooth (registered trademark) communication feature. Herein, a description will be made of a case where a Bluetooth-compatible portable cellular phone (hereinafter, simply, a portable cellular phone) having the Bluetooth communication feature is carried into a compartment of a vehicle in which the onboard device is mounted, and the onboard device and portable cellular phone can communicate with each other under the Bluetooth.

A Bluetooth communication system 1 includes an onboard device 2 (equivalent to a short range communication device of the present disclosure) mounted in a vehicle, and a portable cellular phone 3 (equivalent to a communication-party device relating to the present disclosure) carried into a vehicle compartment. The onboard device 2 includes a control unit 4 (equivalent to a control unit employed in the present disclosure), a Bluetooth module 5 (equivalent to a connection unit employed in the present disclosure), a universal serial bus (USB) module 6, a memory unit 7, an audio processing unit 8, a display control unit 9, a manipulative input unit 10, and a signal input unit 11. The control unit 4, USB module 6, memory unit 7, audio processing unit 8, display control unit 9, manipulative input unit 10, and signal input unit 11 are physically mounted on a control substrate 12. The Bluetooth module 5 is physically mounted on a Bluetooth module substrate 13 that is a member different from the control substrate 12. The control unit 4 and Bluetooth module 5 are connected to each other over a USB.

The control unit 4 includes a CPU realized with a known microcomputer, a RAM, a ROM, and an input/output bus, and controls all actions including a communicating action and data management action of the onboard device 2. The Bluetooth module 5 has a feature of connecting a Bluetooth communication line (equivalent to a short range communication line employed in the present disclosure) with a Bluetooth module of the portable cellular phone 3 which will be described later, and executing Bluetooth communication over the Bluetooth communication line. The Bluetooth module 5 is designed to be able to concurrently validate, as plural profiles that are stipulated in the Bluetooth protocol (make so-called multiple connections), a hands-free profile (HFP) that defines hands-free speech, a message access profile (MAP) that defines transfer of electronic mail data, a serial port profile (SPP) that defines data communication through a virtual serial port, a dial-up networking profile (DUN) that defines a dial-up connection onto the Internet, a phone book access profile (PBAP) that defines transfer of telephone directory data, an object push profile (OPP) that defines transfer of telephone directory data, an advanced audio distribution profile (A2DP) that defines transfer of audio data, and an audio/video remote control profile (AVRCP) that defines transfer of control data concerning control of audio data. The HFP, MAP, SPP, DUN, PBAP, OPP, A2DP, and AVRCP signify data communications protocols stipulated for respective features.

The USB module 6 has a connection terminal 6a into or from which a connection terminal 14a of a USB connection cable 14 can be plugged or unplugged. The USB module 6 has a feature that when one of the connection terminals 14a of the USB connection cable 14 is plugged into the connection terminal 6a, and the other connection terminal 14b of the USB connection cable 14 is plugged into a connection terminal of a USB module of the portable cellular phone 3 which will be described later, connects a USB communication line with the USB module of the portable cellular phone 3, and executes USB communication over the USB communication line.

The memory unit 7 has a memory area in which various kinds of data items are stored. In this case, when the Bluetooth module 5 validates MAP with respect to a Bluetooth module of the portable cellular phone 3, electronic mail data transferred from the portable cellular phone 3 to the Bluetooth module 5 (for example, addresser information with which a source of an electronic mail can be identified, receiving date information with which a date when an electronic mail is received by the portable cellular phone 3 can be identified, type information with which a type of electronic mail can be identified, or message subject information with which a message subject of an electronic mail entered by, for example, an addresser can be identified) is stored in the memory unit 7. When the Bluetooth module 5 validates PBAP with respect to the Bluetooth module of the portable cellular phone 3, telephone directory data transferred from the portable cellular phone 3 to the Bluetooth module 5, call origination history data representing association of an originating time and originating telephone number with an originating action performed by the onboard device 2 or an originating action performed by the portable cellular phone 3 that has validated HFP with respect to the onboard device 2, call termination history data representing association of a terminating time and terminating telephone number with a terminating action performed by the portable cellular phone 3 that has validated HFP with respect to the onboard device 2, or the like is stored in the memory unit 7.

A microphone 15 disposed at a position in a vehicle compartment at which voice uttered by, for example, a user in the vicinity of a steering wheel can be readily collected is connected to the audio processing unit 8. In addition, an audio amplifier 16 disposed outside the onboard device 2 is connected to the audio processing unit 8. Loudspeakers 17a and 17b are connected to the audio amplifier 16.

When the Bluetooth module 5 and the Bluetooth module of the portable cellular phone 3 validate HFP with respect to each other, if the audio processing unit 8 inputs voice uttered by a user as transmission-speech audio data through the microphone 15, the audio processing unit 8 processes the inputted transmission-speech audio data, and outputs the resultant data to the Bluetooth module 5. When the audio processing unit 8 inputs receiving-speech audio data from the Bluetooth module 5, the audio processing unit 8 outputs the inputted receiving-speech audio data to the audio amplifier 16.

When the Bluetooth module 5 and the Bluetooth module of the portable cellular phone 3 which will be described later validate A2DP or AVRCP with respect to each other, the audio processing unit 8 outputs sound data, which is transferred from the Bluetooth module of the portable cellular phone 3 to the Bluetooth module 5 under A2DP or AVRCP, to the audio amplifier 16. When the USB module 6 and a USB module of the portable cellular phone 3 which will be described later can execute USB communication with respect to each other, the audio processing unit 8 outputs sound data, which is transferred from the USB module of the portable cellular phone 3 to the USB module 6 over a USB communication line, to the audio amplifier 16.

When the audio amplifier 16 inputs receiving-speech audio data or sound data from the audio processing unit 8, the audio amplifier 16 amplifies the inputted receiving-speech audio data or sound data, and allows the resultant data to radiate through the loudspeakers 17a and 17b. A tuner 18 is connected to the audio amplifier 18. When the audio amplifier 16 inputs tune data, which the tuner 18 has reproduced from, for example, a music recording medium, from the tuner 18, the audio amplifier 16 amplifies the inputted tune data, and allows the resultant data to radiate through the loudspeakers 17a and 17b.

A display device 19 includes a display unit 20 on which various display screen images are displayed, and an operating unit 21 that forms touch switches on the display screen image. When the display control unit 9 inputs a display command signal from the control unit 4, the display control unit 9 controls a displaying action of the display unit 20, which is included in the display device 19, on the basis of the inputted display command signal. When the manipulative input unit 10 inputs a manipulation detection signal from the operating unit 21 in response to a manipulation which a user has performed on any of the touch switches formed on the display screen image, the manipulative input unit 10 outputs the inputted manipulation detection signal to the control unit 4. The control unit 4 analyzes the manipulation detection signal inputted from the manipulative input unit 10, and identifies the manipulation the user has performed.

The signal input unit 11 is connected to an accessory switch mounted in a vehicle. When the signal input unit 11 inputs an accessory signal outputted from the accessory switch, the signal input unit 11 outputs the inputted accessory signal to the control unit 4. The control unit 4 turns on or off a device power supply on the basis of an on or off state of the accessory signal inputted from the signal input unit 11. Specifically, the control unit 4 turns on the device power supply (starts the onboard device 2) at the timing when the accessory signal makes an off-to-on transition, and turns off the device power supply (stops the onboard device 2) at the timing when the accessory signal makes an on-to-off transition.

The portable cellular phone 3 includes a control unit 22, a telephone communication unit 23, a Bluetooth module 24 (equivalent to a communication-party connection unit employed in the present disclosure), a USB module 25, a key input unit 26, a memory unit 27, a display unit 28, a microphone 29, a loudspeaker 30, and a power feeder 31.

The control unit 22 includes a CPU realized with a known microcomputer, a RAM, a ROM, and an input/output bus, and controls all actions including a communicating action or data management action of the portable cellular phone 3. The telephone communication unit 23 executes telephone communication over a communication network 33. Incidentally, the communication network 33 accommodates facilities, which provide known portable cellular phone communication services, such as, portable cellular phone base stations and base-station control devices. The Bluetooth module 24 has a feature that connects a Bluetooth communication line with the Bluetooth module 5 of the onboard device 2, and executes Bluetooth communication over the Bluetooth communication line. The Bluetooth module 24 is designed to be able to concurrently validate plural profiles, which are stipulated in the Bluetooth protocol, such as, HFP, MAP, SPP, DUN, PBAP, OPP, A2DP, and AVRCP.

The USB module 25 has a connection terminal 25a into or from which the connection terminal 14b of the USB connection cable 14 can be plugged or unplugged. The USB module 25 has a feature that when one of the connection terminals 14a of the USB cable 14 is plugged into the connection terminal 6a of the USB module 6 of the onboard device 2, and the other connection terminal 14b of the USB connection cable 14 is plugged into the connection terminal 25a, connects a USB communication line with the USB module 6 of the onboard device 2 and executes USB communication over the USB communication line.

The key input unit 26 includes various keys which a user can manipulate, and outputs a manipulation detection signal to the control unit 22 in response to a manipulation the user has performed on any of the keys. The control unit 22 analyzes the manipulation detection signal inputted from the key input unit 26, and identifies the manipulation the user has performed. The memory unit 27 has a memory area in which various kinds of data items are stored. When the display unit 28 inputs a display command signal from the control unit 22, the display unit 28 displays various display screen images on the basis of the inputted display command signal. When inputting voice, which the user has uttered, as transmission-speech audio data through the microphone 29, the control unit 22 processes the inputted transmission-speech audio data. When inputting receiving-speech audio data from the telephone communication unit 23, the control unit 22 allows the inputted receiving-speech audio data to radiate as voice through the loudspeaker 30. The power feeder 31 feeds power, which is released from a battery 32 attachable or detachable to or from the main unit of the power feeder, as operating power to functional blocks.

In the foregoing configuration, after allowing the Bluetooth module 5 and Bluetooth module 24 to connect a Bluetooth communication line between them, the control unit 4 first causes HFP to be automatically validated between the Bluetooth module 5 and Bluetooth module 24 (without prompting a user to perform a manipulation). Thereafter, the control unit 4 causes PABP to be automatically validated between the Bluetooth module 5 and Bluetooth module 24 (without prompting the user to perform a manipulation). With HFP validated, the control unit 4 initiates data communication (transfer of telephone directory data) under PABP. When deciding that the data communication under PABP has been completed, the control unit 4 invalidates PABP that has been validated between the Bluetooth module 5 and Bluetooth module 24, and leaves HFP alone validated.

In the foregoing configuration, when SPP is validated between the Bluetooth module 5 and Bluetooth module 24, if a user performs at the operating unit 21 a manipulation intended to execute the data communication with the portable cellular phone 3, data responsive to the user manipulation is transferred between the Bluetooth module 5 and Bluetooth module 24 under SPP. Specifically, SPP is a data communications protocol that defines data communication concerning data responsive to a user manipulation which has been mentioned in relation to the present disclosure. When HFP is validated between the Bluetooth module 5 and Bluetooth module 24, if voice call termination at the portable cellular phone 3 over the communication network 33 takes place, data (voice call termination notification data) with which the portable cellular phone 3 notifies the onboard device 2 of occurrence of voice call termination is transferred from the Bluetooth module 5 to the Bluetooth module 24 under HFP. When MAP is validated between the Bluetooth module 5 and Bluetooth module 24, if an electronic mail termination at the portable cellular phone 3 over the communication network 3 takes place, data (electronic mail termination notification data) with which the portable cellular phone 3 notifies the onboard device 2 of occurrence of electronic mail termination is transferred from the Bluetooth module 5 to the Bluetooth module 24 under MAP. Namely, HFP and MAP are data communications protocols that define, as mentioned in relation to the present disclosure, data communication concerning data which represents a notification of call termination at a communication-party device over the communication network.

When DUN is validated between the Bluetooth module 5 and Bluetooth module 24, if a user performs at the operating unit 21 a manipulation intended to make a dial-up connection from the portable cellular phone 3, data necessary to make the dial-up connection is transferred between the Bluetooth module 5 and Bluetooth module 24 under DUN. Namely, DUN is a data communications protocol that defines, as mentioned in relation to the present disclosure, data communication concerning data necessary for a communication-party device to connect onto the communication network.

Referring to FIG. 2 to FIG. 14, an operation exerted in the aforesaid configuration will be described below. FIG. 2 to FIG. 6 are flowcharts presenting processing to be executed by the control unit 4 of the onboard device 2.

In the onboard device 2, when the device power supply of the onboard device 2 is turned on (the accessory switch is turned on), the control unit 4 executes main processing, and executes as pieces of sub-processing of the main processing data communication initiation request determination processing and data communication completion determination processing. The pieces of processing will be sequentially described below.

Figure 2:
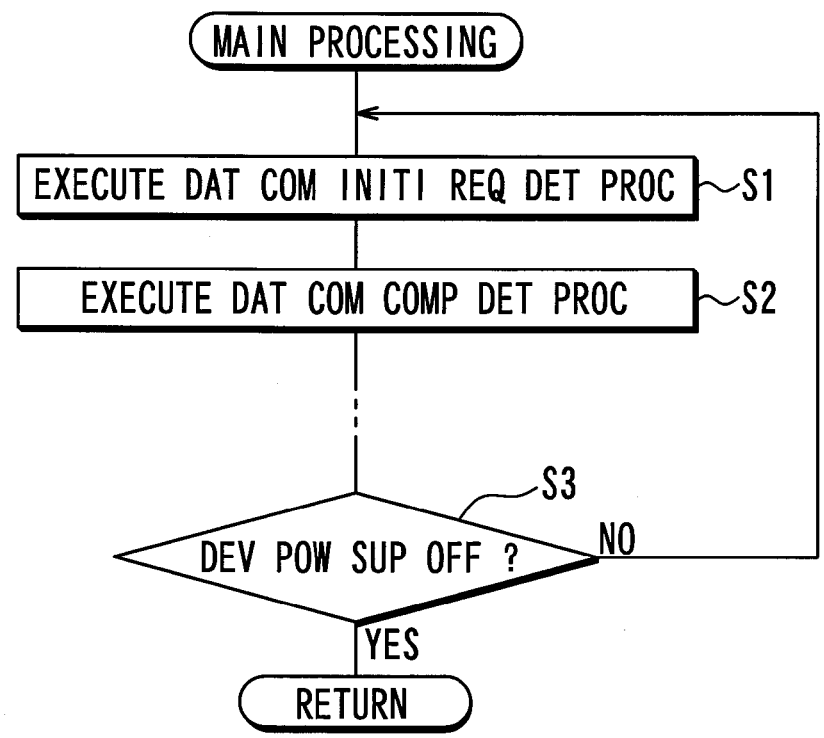
FIG. 2 is a flowchart presenting a main processing to be performed by an onboard device.

(1) Main Processing (See FIG. 2)

When the control unit 4 determines that the device power supply of the onboard device 2 is turned on, the control unit 4 initiates main processing, and regularly executes data communication initiation request determination processing and data communication completion determination processing in predetermined cycles until the control unit determines that the device power supply is turned off (steps S1 to S3).

Figure 3:
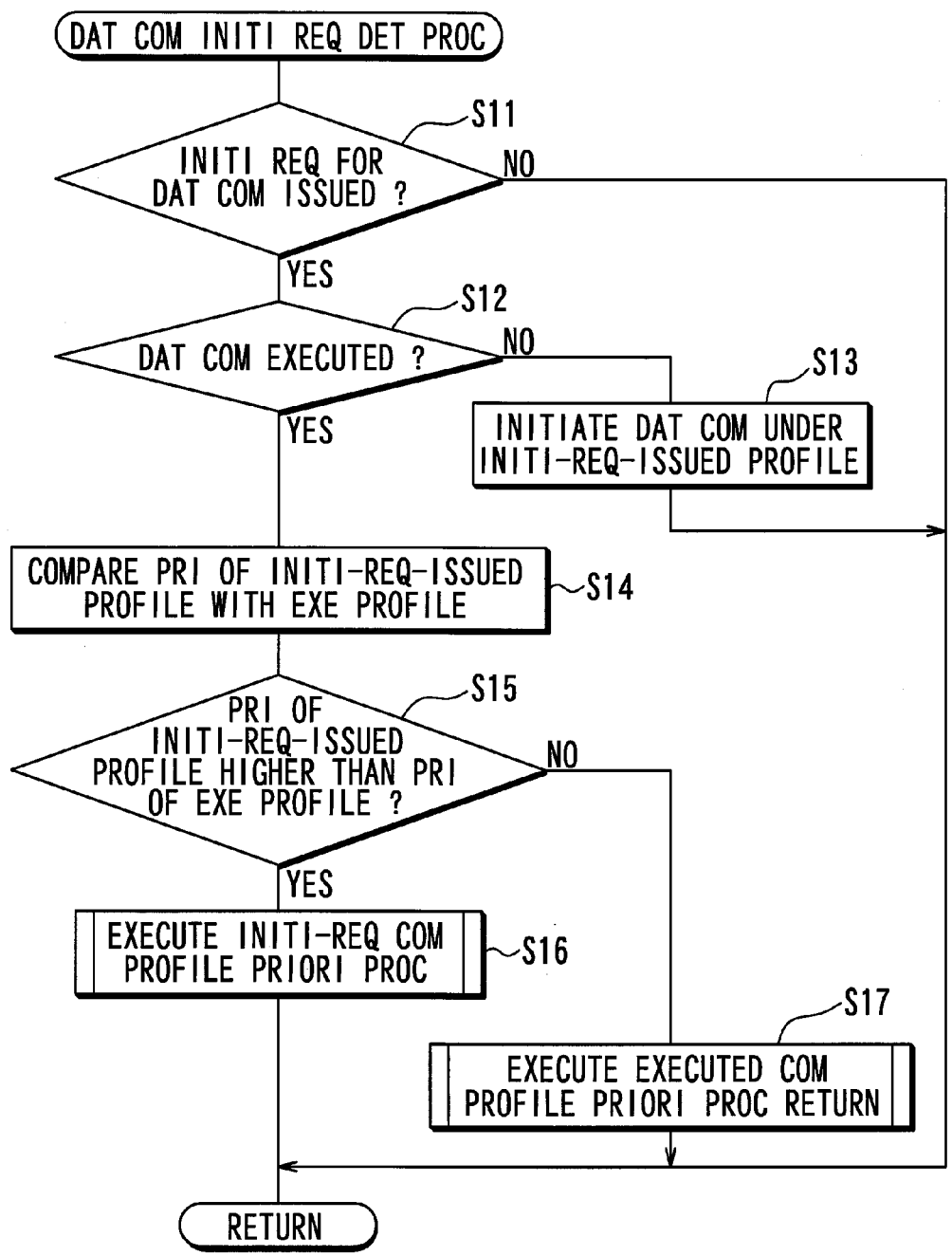
FIG. 3 is a flowchart presenting a data communication initiation request determination processing.
Figure 4:
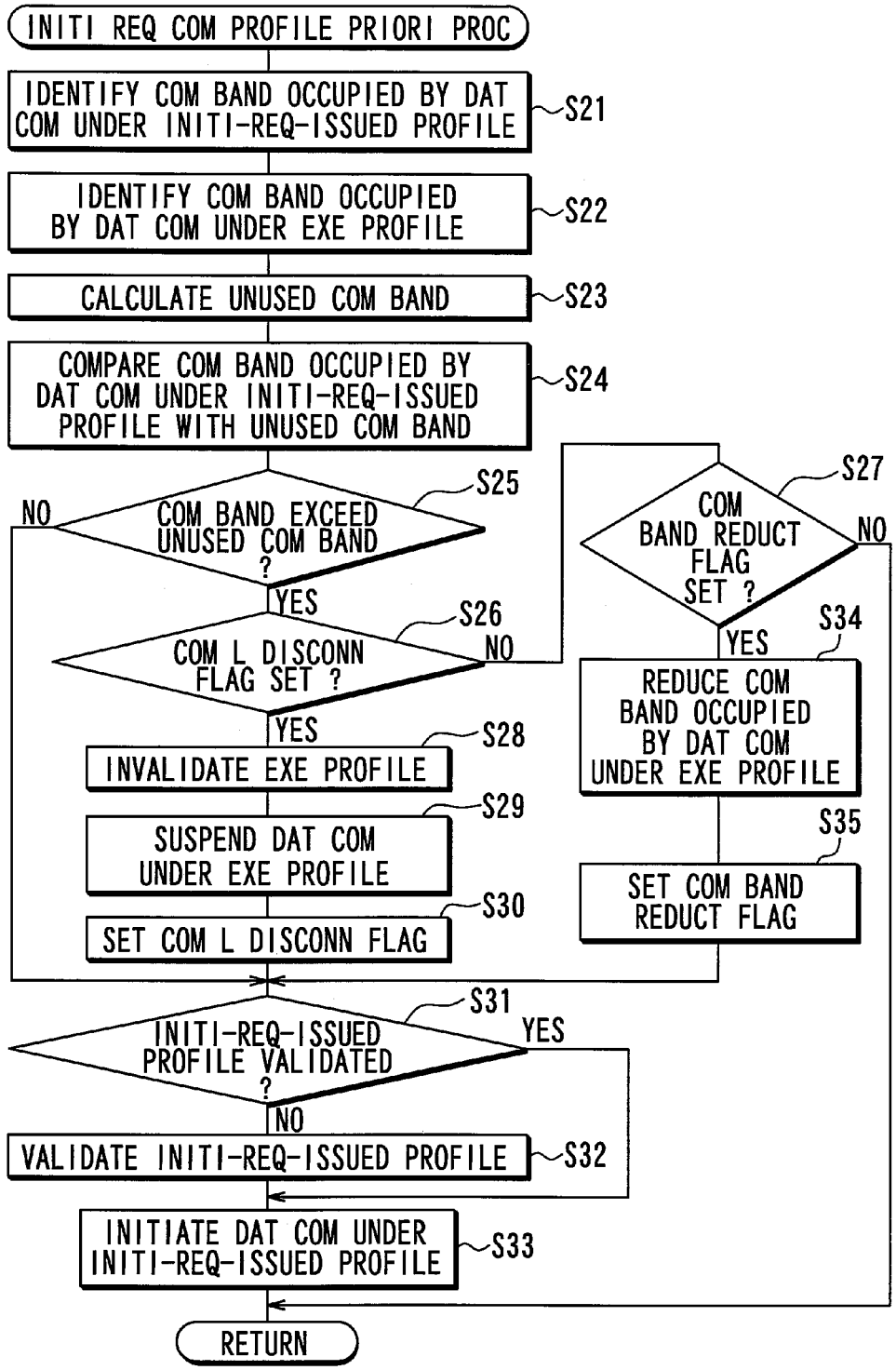
FIG. 4 is a flowchart presenting an initiation requested communication prioritizing processing.
Figure 5:
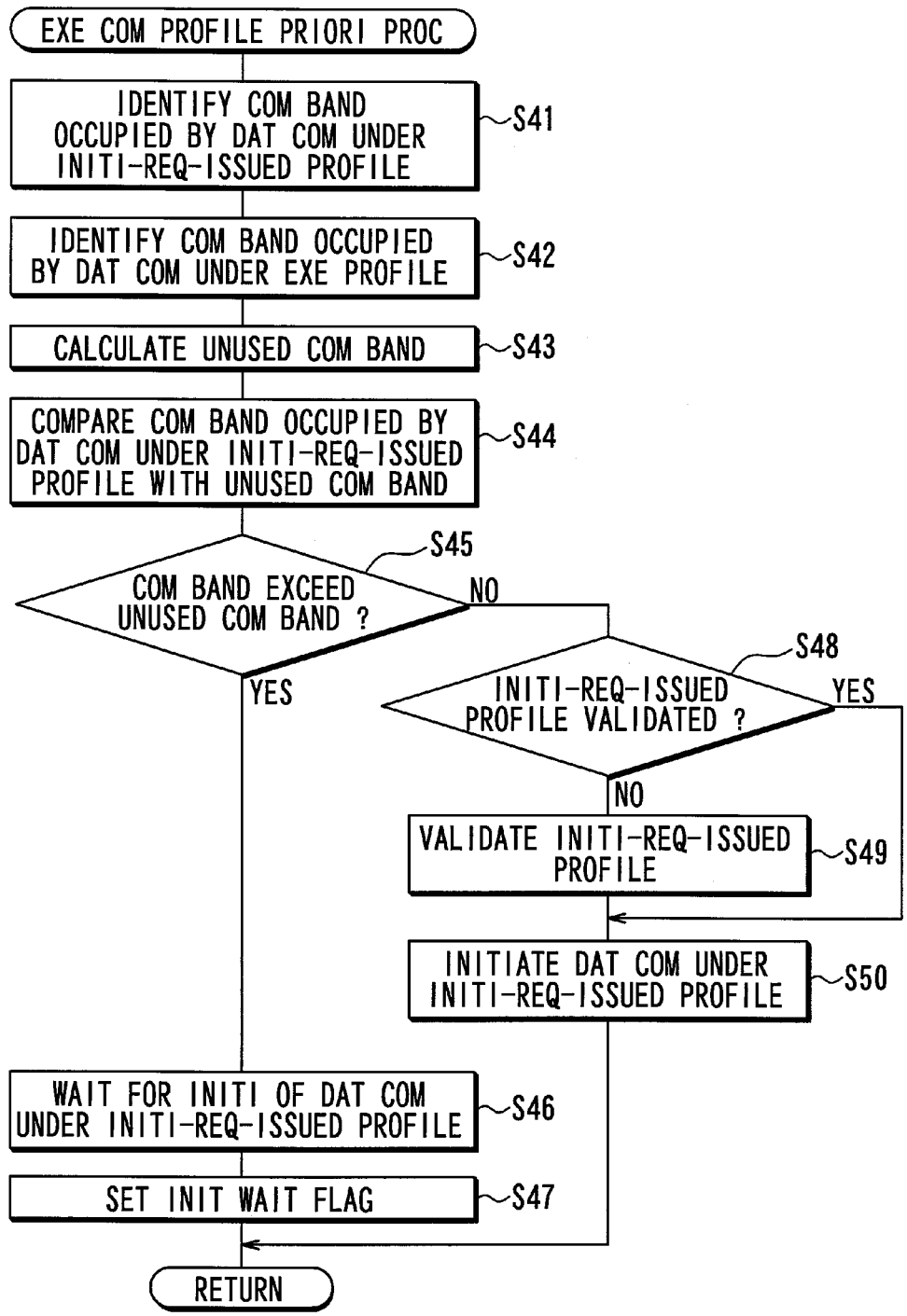
FIG. 5 is a flowchart presenting an executed communication profile prioritizing processing.

(2) Data Communication Initiation Request Determination Processing (See FIG. 3 to FIG. 5)

The control unit 4 shifts from main processing to data communication initiation request determination processing, and initiates the data communication initiation request determination processing. Then, the control unit 4 determines, for example, whether a user has performed at the operating unit 21 a predetermined manipulation that accompanies data communication, whether a preset data communication initiation time has come, or whether an initiation request for data communication under any of the profiles has been issued (step S11).

When the control unit 4 determines, for example, that a user has performed at the operating unit 21 a predetermined manipulation which accompanies data communication, that a preset data communication initiation time has come, or that an initiation request for data communication under any of the profiles has been issued (Yes at step S11), the control unit 4 determines, for example, whether the Bluetooth module 5 is transmitting a command, event, or packet to the Bluetooth module 24 (or waiting for transmission), or whether the Bluetooth module 5 is receiving a command, event, or packet from the Bluetooth module 24 (or waiting for receiving), and determines whether data communication under any of the profiles is being executed, that is, whether data communications under two profiles compete with each other (step S12).

In this case, the control unit 4 determines, for example, that the Bluetooth module 5 is not transmitting a command, event, or packet to the Bluetooth module 24 or that the Bluetooth module 5 is not receiving a command, event, or packet from the Bluetooth module 24, and determines that data communication under any other profile is not being executed, that is, data communications under two profiles do not compete with each other (No at step S12), the control unit 4 initiates data communication under a profile that defines data communication for which an initiation request has been issued (step S13). The control unit 4 then terminates data communication initiation request determination processing, and returns to main processing.

In contrast, when the control unit 4 determines, for example, that the Bluetooth module 5 is transmitting a command, event, or packet to the Bluetooth module 24, or that the Bluetooth module 5 is receiving a command, event, or packet from the Bluetooth module 24, and determines that data communication under any other profile is being executed, that is, data communications under two profiles compete with each other (Yes at step S12), the control unit 4 compares a priority, which is given to a profile that defines data communication for which an initiation request has been issued, with a priority given to a profile which defines data communication that is being executed (step S14).

When the control unit 4 determines that the priority of the profile defining data communication for which an initiation request has been issued is higher than the priority of the profile which defines data communication that is being executed (Yes at step S15), the control unit 4 shifts to initiation-requested communication profile prioritizing processing of prioritizing data communication under the profile, which defines data communication for which an initiation request has been issued, rather than data communication under the profile which defines the data communication that is being executed (step S16).

In contrast, when the control unit 4 determines that the priority of the profile defining data communication for which an initiation request has been issued is not higher (is equal to or lower) than the priority of the profile which defines data communication that is being executed (No at step S15), the control unit 4 shifts to executed-communication profile prioritizing processing of prioritizing data communication under the profile, which defines the data communication that is being executed, rather than data communication under the profile which defines data communication for which an initiation request has been issued (step S17).

The control unit 4 shifts from data communication initiation request determination processing to initiation-requested communication profile prioritizing processing, and initiates the initiation-requested communication profile prioritizing processing. Then, the control unit 4 identifies a communication band to be occupied by data communication under the profile which defines the data communication for which an initiation request has been issued (step S21), and identifies a communication band occupied by data communication under the profile which defines the data communication that is being executed (step S22). The control unit 4 then calculates an unused communication band by subtracting the communication band, which is occupied by the data communication under the profile which defines the data communication that is being executed, from a communication band stipulated for the Bluetooth communication line (step S23), and compares the communication band, which is to be occupied by the data communication under the profile that defines the data communication for which an initiation request has been issued, with the calculated unused communication band (step S24).

When the control unit 4 determines that the communication band to be occupied by data communication under the profile that defines the data communication for which an initialization request has been issued exceeds the unused communication band, that is, it is impossible to initiate the data communication under the profile, which defines the data communication for which an initiation request has been issued, in the current occupied state of the communication band for the Bluetooth communication line (an unused communication band is not found) (step S25), the control unit 4 determines whether a communication line disconnection flag signifying that the profile which defines data communication that is being executed is invalidated has been set (step S26), and determines whether a communication band reduction flag signifying that the communication band to be occupied by the data communication under the profile which defines the data communication that is being executed is reduced has been set (step S27). The communication line disconnection flag or communication band reduction flag is selected and set in advance by, for example, a user. The user manipulates the operating unit 21 connected to the onboard device 2 so as to set either of the flags.

When the control unit 4 determines that the communication line disconnection flag has been set (Yes at step S26), the control unit 4 invalidates the profile which defines data communication that is being executed (step S28), suspends the data communication under the profile which defines the data communication that is being executed (step S29), and sets a communication line disconnected flag signifying that the profile which defines the data communication that is being executed has been invalidated (step S30).

Thereafter, the control unit 4 determines whether the profile defining data communication for which an initiation request has been issued has been validated between the Bluetooth module 5 and Bluetooth module 24 (step S31). When the control unit 4 determines that the profile defining the data communication for which an initiation request has been issued has been validated between the Bluetooth module 5 and Bluetooth module 24 (Yes at step S31), the control unit 4 initiates the data communication under the profile defining the data communication for which an initiation request has been issued (step S33). The control unit 4 then terminates initiation-requested communication profile prioritizing processing, and returns to data communication initiation request determination processing.

In contrast, when the control unit 4 determines that the profile defining data communication for which an initiation request has been issued has not been validated between the Bluetooth module 5 and Bluetooth module 24 (No at step S31), the control unit 4 validates the profile, which defines the data communication for which an initiation request has been issued, between the Bluetooth module 5 and Bluetooth module 24 (step S32). Thereafter, the control unit 4 initiates data communication under the profile defining the data communication for which an initiation request has been issued (step S33). The control unit 4 then terminates initiation-requested communication profile prioritizing processing, and returns to data communication initiation request determination processing.

When the control unit 4 determines that the communication band reduction flag has been set (Yes at step s27), the control unit 4 does not invalidate the profile which defines data communication that is being executed, but reduces the communication band, which is to be occupied by the data communication under the profile which defines the data communication that is being executed, to such an extent that the communication band to be occupied by data communication under the profile defining the data communication for which an initiation request has been issued does not exceed the unused communication band, that is, the data communication under the profile defining the data communication for which an initiation request has been issued can be initiated (an unused communication band is found) (step S34). The control unit 4 then sets a communication band reduced flag signifying that the communication band to be occupied by the data communication under the profile which defines the data communication that is being executed has been reduced (step S35), and executes the processing from step S31 to step S33. The control unit 4 then terminates initiation-requested communication profile prioritizing processing, and returns to data communication initiation request determination processing.

When the control unit 4 determines that the communication band to be occupied by data communication under the profile defining the data communication for which an initiation request has been issued does not exceed the unused communication band, that is, it is possible to initiate the data communication under the profile, which defines the data communication for which an initiation request has been issued, in the current occupied state of the communication band for the Bluetooth communication line (an unused communication band is found) (No at step S25), the control unit 4 neither invalidates the profile which defines data communication that is being executed nor reduces the communication band to be occupied by the data communication under the profile which defines the data communication that is being executed, but executes the processing from step S21 to step S23. The control unit 4 then terminates initiation-requested communication profile prioritizing processing, and returns to data communication initiation request determination processing.

In contrast, after the control unit 4 shifts from data communication initiation request determination processing to executed-communication profile prioritizing processing, and initiates the executed-communication profile prioritizing processing, the control unit 4 identifies the communication band to be occupied by data communication under the profile defining the data communication for which an initiation request has been issued (step S41), and identifies the communication band occupied by data communication under the profile which defines the data communication that is being executed (step S42). Thereafter, the control unit 4 calculates an unused communication band by subtracting the communication band, which is occupied by the data communication under the profile, which defines the data communication that is being executed, from the communication band stipulated for the Bluetooth communication line (step S43), and compares the communication band, which is occupied by the data communication under the profile, which defines the data communication for which an initiation request has been issued, with the calculated unused communication band (step S44).

When the control unit 4 determines that the communication band to be occupied by data communication under the profile defining the data communication for which an initiation request has been issued exceeds the unused communication band, that is, it is impossible to initiate the data communication under the profile, which defines the data communication for which an initiation request has been issued, in the current occupied state of the communication band for the Bluetooth communication line (Yes at step S45), the control unit 4 waits for initiation of the data communication under the profile defining the data communication for which an initiation request has been issued (step S46), and sets an initiation waited flag signifying that initiation of the data communication under the profile defining the data communication for which an initiation request has been issued is waited (step S47). The control unit 4 then terminates executed-communication profile prioritizing processing, and returns to data communication initiation request determination processing.

In contrast, when the control unit 4 determines that the communication band to be occupied by data communication under the profile defining the data communication for which an initiation request has been issued does not exceed the unused communication band, that is, it is possible to initiate the data communication under the profile, which defines the data communication for which an initiation request has been issued, in the current occupied state of the communication band for the Bluetooth communication line (No at step S45), the control unit 4 determines whether the profile defining the data communication for which an initiation request has been issued has been validated between the Bluetooth module 5 and Bluetooth module 24 (step S48). When the control unit 4 determines that the profile defining the data communication for which an initiation request has been issued has been validated between the Bluetooth module 5 and Bluetooth module 24 (Yes at step S48), the control unit 4 initiates the data communication under the profile defining the data communication for which an initiation request has been issued (step S50). Thereafter, the control unit 4 terminates executed-communication profile prioritizing processing, and returns to data communication initiation request determination processing.

In contrast, when the control unit 4 determines that the profile has not been validated between the Bluetooth module 5 and Bluetooth module 24 (No at step S48), the control unit 4 validates the profile, which defines the data communication for which an initiation request has been issued, between the Bluetooth module 5 and Bluetooth module 24 (step S49). Thereafter, the control unit 4 initiates the data communication under the profile defining the data communication for which an initiation request has been issued (step S50), terminates executed-communication profile prioritizing processing, and returns to data communication initiation request determination processing.

Figure 6:
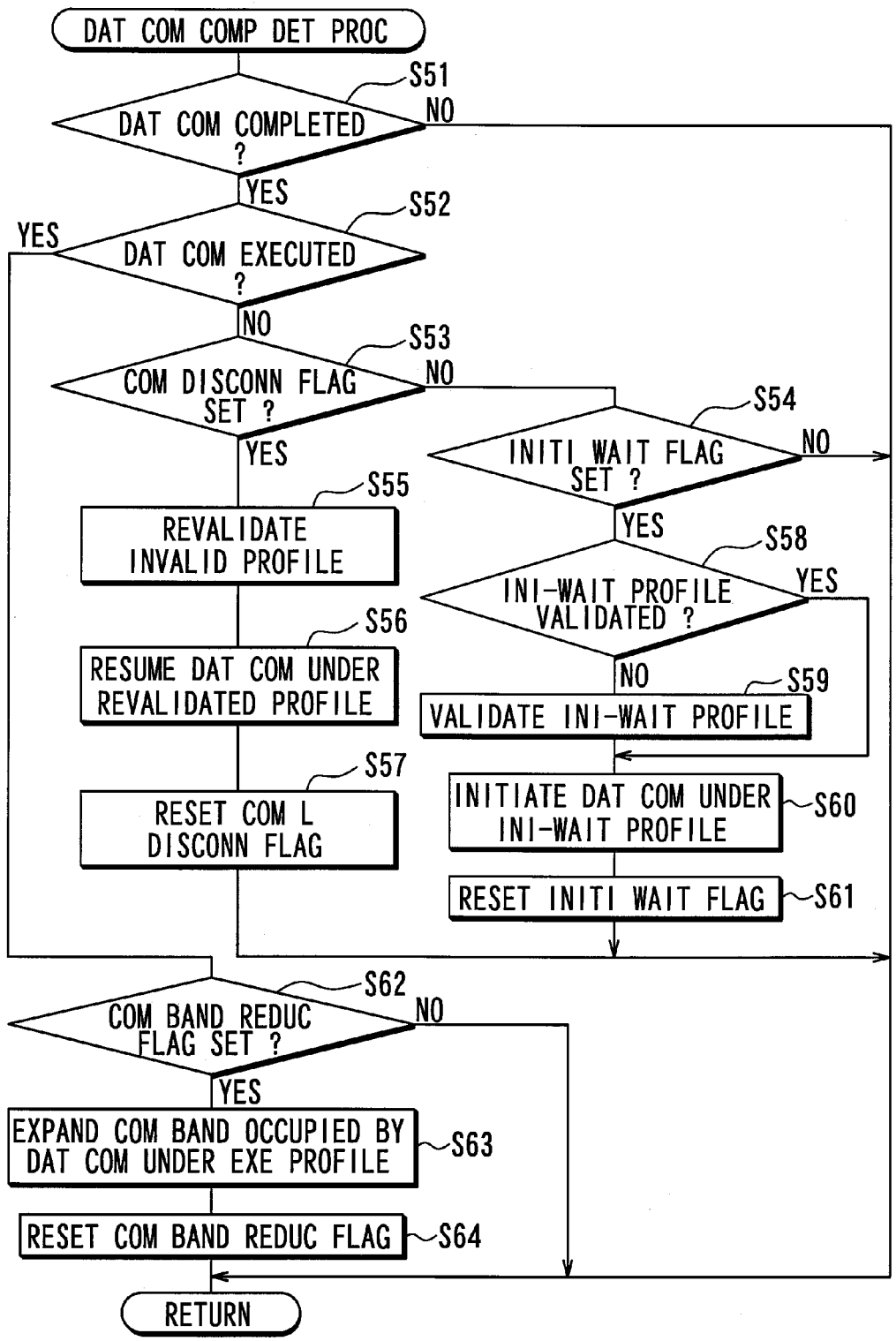
FIG. 6 is a flowchart presenting a data communication completion determination processing.

(3) Data Communication Completion Determination Processing (See FIG. 6)

The control unit 4 shifts from main processing to data communication completion determination processing, and initiates the data communication completion determination processing. The control unit 4 then determines whether data communication under any of the profiles has been completed (step S51). When the control unit 4 determines that the data communication under any of the profiles has been completed (Yes at step S51), the control unit 4 determines whether the data communication under any of the profiles is being executed (is continued) (step S52).

When the control unit 4 determines that the data communication under any of the profiles is not being executed (No at step S52), the control unit 4 determines whether a communication line-disconnected flag has been set, that is, whether a profile defining data communication that is being executed is invalidated at the time of initiating data communication under a profile defining the data communication that has been completed (step S53). The control unit 4 then determines whether an initiation-waited flag has been set, that is, whether initiation of data communication under any profile is waited for during execution of the data communication under the profile defining the data communication that has been completed (step S54).

When the control unit 4 determines that a communication line-disconnected flag has been set, that is, that a profile defining data communication that is being executed is invalidated at the time of initiating data communication under a profile defining the data communication that has been completed (Yes at step S53), the control unit 4 revalidates the invalidated profile between the Bluetooth module 5 and Bluetooth module 24 (step S55), resumes data communication under the revalidated profile (step S56), and resets the communication line-disconnected flag (step S57). The control unit 4 then terminates data communication completion determination processing, and returns to main processing.

When the control unit 4 determines that an initiation-waited flag has been set, that is, initiation of data communication under any profile is waited for during execution of data communication under a profile defining the data communication that has been completed (Yes at step S54), the control unit 4 determines whether the profile defining data communication whose initiation has been waited for is validated between the Bluetooth module 5 and Bluetooth module 24 (step S58).

When the control unit 4 determines that the profile defining data communication whose initiation has been waited for has been validated between the Bluetooth module 5 and Bluetooth module 24 (Yes at step S58), the control unit 4 initiates the data communication under the profile defining the data communication whose initiation has been waited for (step S60), and resets an initiation-waited flag (step S61). The control unit 4 then terminates data communication completion determination processing, and returns to main processing.

In contrast, when the control unit 4 determines that the profile defining data communication whose initiation has been waited for has not been validated between the Bluetooth module 5 and Bluetooth module 24 (No at step S48), the control unit 4 validates the profile, which defines the data communication whose initiation has been waited for, between the Bluetooth module 5 and Bluetooth module 24 (step S59). Thereafter, the control unit 4 initiates the data communication under the profile defining the data communication whose initiation has been waited for (step S60), and resets the initiation-waited flag (step S61). The control unit 4 then terminates data communication completion determination processing, and returns to main processing.

When the control unit 4 determines that data communication under any profile is being executed (Yes at step S52), the control unit 4 determines whether a communication band-reduced flag has been set, that is, whether a communication band to be occupied by data communication under a profile defining the data communication that is being executed has been reduced at the time of initiating data communication under a profile defining the data communication that has been completed (step S62). When the control unit 4 determines that a communication band-reduced flag has been set, that is, a communication band to be occupied by the data communication under the profile defining the data communication that is being executed has been reduced at the time of initiating the data communication under the profile defining the data communication that has been completed (Yes at step S62), the control unit 4 expands (restores) the reduced communication band (step S63), and resets the communication band-reduced flag (step S64). The control unit 4 then terminates data communication completion determination processing, and returns to main processing.

The foregoing series of pieces of processing will be described concretely. Herein, the priority of a profile defining data communication for which a user wants to raise a data transmission speed (wants to ensure instantaneousness) is regarded as a higher priority, and higher-priority profiles include, for example, HFP, MAP, SPP, and DUN. The priority of a profile defining data communication for which the user does not want to raise the data transmission speed (does not want to ensure instantaneousness) is regarded as a lower priority, and lower-priority profiles include, for example, PBAP and OPP. Incidentally, the priorities of the profiles may be preset in the memory unit 7 by a manufacturer which manufactures the onboard device 2. Otherwise, after the onboard device 2 is mounted on a vehicle, the user may manipulate the operating unit 21 connected to the onboard device 2 so as to set the priorities.

To begin with, referring to FIG. 7 to FIG. 11, a description will be made of a case where while data communication under a profile having a higher priority is being executed, an initiation request for data communication under a profile having a lower priority is issued.

Figure 7:
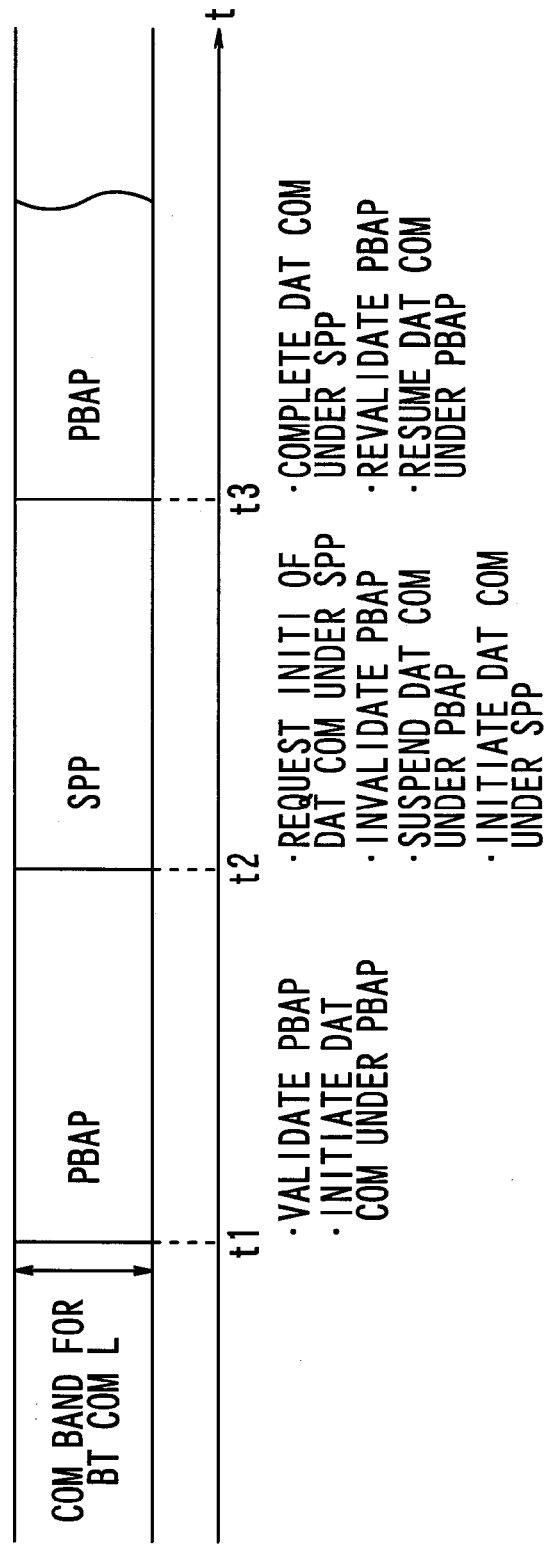
FIG. 7 is a diagram showing a transition of a communication band for a Bluetooth communication line.

As mentioned above, when the control unit 4 connects a Bluetooth communication line between the Bluetooth module 5 and Bluetooth module 24, the control unit 4 first causes HFP to be automatically validated between the Bluetooth module 5 and Bluetooth module 24. Thereafter, the control unit 4 causes PBAP to be automatically validated between the Bluetooth module 5 and Bluetooth module 24. As shown in FIG. 7, the control unit 4 initiates data communication under PBAP with HFP validated (see t1). Herein, when the control unit 4 determines that an initiation request for data communication under SPP has been issued because, for example, a user has performed a predetermined manipulation at the operating unit 21 prior to completion of data communication under PBAP, that is, during execution of data communication under PBAP, determines that a communication band to be occupied by the data communication under SPP defining the data communication for which an initiation request has been issued exceeds an unused communication band (an unused communication band is not found), and determines that a communication line disconnection flag has been set, the control unit 4 invalidates PBAP defining the data communication that is being executed. The control unit 4 then suspends the data communication under PBAP defining the data communication that is being executed, and initiates the data communication under SPP (see t2). Thereafter, when the control unit 4 determines that the data communication under SPP has been completed, the control unit 4 revalidates the invalidated PBAP, and resumes the suspended data communication under the PBAP (see t3).

Figure 8:
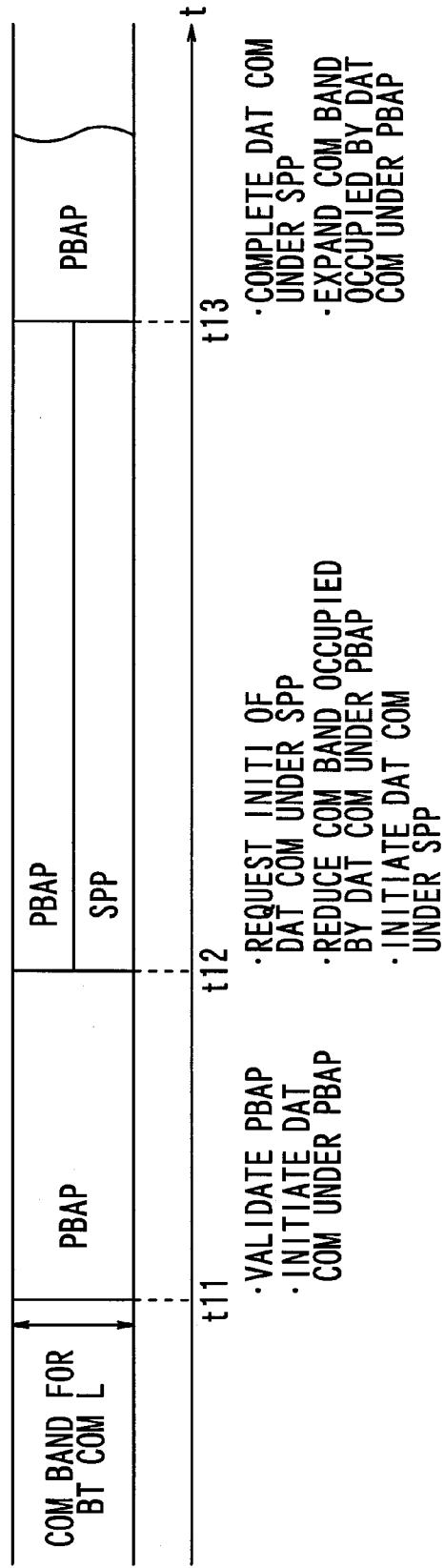
FIG. 8 is a diagram showing another transition of a communication band for a Bluetooth communication line.

As shown in FIG. 8, after the control unit 4 initiates data communication under PBAP (see t11), when the control unit 4 determines that an initiation request for data communication under SPP has been issued during execution of the data communication under PBAP, determines that a communication band to be occupied by the data communication under SPP defining the data communication for which an initiation request has been issued exceeds an unused communication band, and determines that a communication band reduction flag has been set, the control unit 4 does not invalidate PBAP defining the data communication that is being executed, but reduces a communication band to be occupied by the data communication under PBAP defining the data communication that is being executed, and initiates the data communication under SPP (see t12). Thereafter, when the control unit 4 determines that the data communication under SPP has been completed prior to completion of the data communication under PBAP, the control unit 4 expands the reduced communication band to be occupied by the data communication under PBAP, and continues the data communication under PBAP (see t13).

Figure 9:
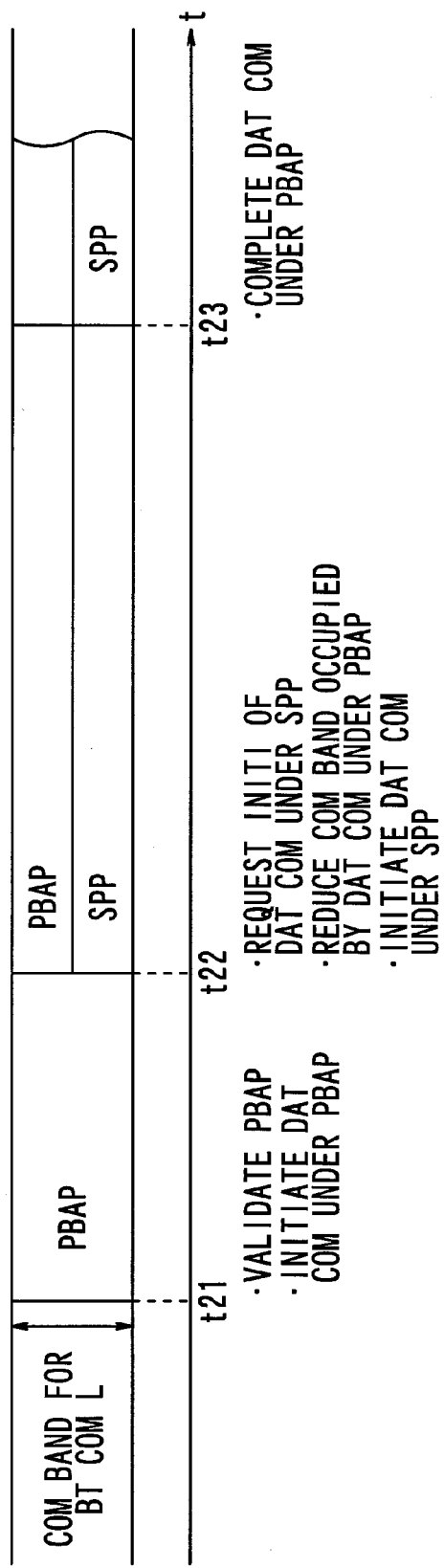
FIG. 9 is a diagram showing another transition of a communication band for a Bluetooth communication line.

As shown in FIG. 9, after the control unit 4 initiates data communication under PBAP (see t21), when the control unit 4 determines that an initiation request for data communication under SPP has been issued during execution of the data communication under PBAP, determines that a communication band to be occupied by the data communication under SPP defining the data communication for which an initiation request has been issued exceeds an unused communication band, and determines that a communication band reduction flag has been set, the control unit 4 does not invalidate PBAP defining the data communication that is being executed, but reduces a communication band to be occupied by the data communication under PBAP defining the data communication that is being executed, and initiates the data communication under SPP (see t22). Thereafter, when the control unit 4 determines that the data communication under PBAP has been completed prior to completion of the data communication under SPP, the control unit 4 continues the data communication under SPP (see t23). In this case, since the data communication under PBAP that has been initiated previously has been completed, the unused communication band is generated. Therefore, the control unit 4 may expand the communication band to be occupied by the data communication under SPP, and continues the data communication.

Figure 10:
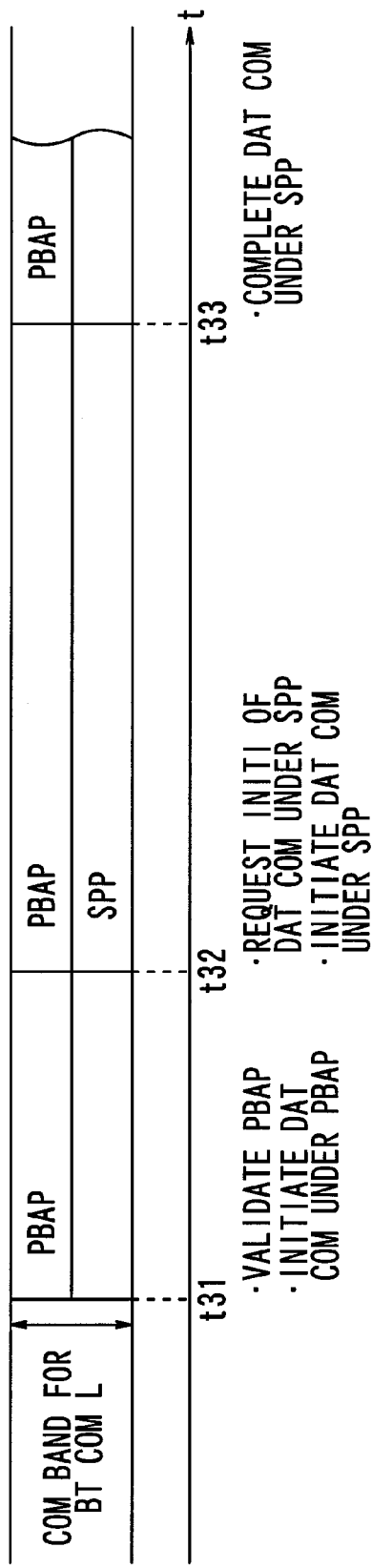
FIG. 10 is a diagram showing another transition of a communication band for a Bluetooth communication line.

As shown in FIG. 10, after the control unit 4 initiates data communication under PBAP (see t31), when the control unit 4 determines that an initiation request for data communication under SPP has been issued during execution of the data communication under PBAP, and determines that a communication band to be occupied by the data communication under SPP defining the data communication for which an initiation request has been issued does not exceed an unused communication band (the unused communication band is found), the control unit 4 continues the data communication under PBAP defining the data communication that is being executed, and initiates the data communication under SPP (see t32). Thereafter, when the control unit 4 determines that the data communication under SPP has been completed prior to completion of the data communication under PBAP, the control unit 4 continues the data communication under PBAP (see t33).

Figure 11:
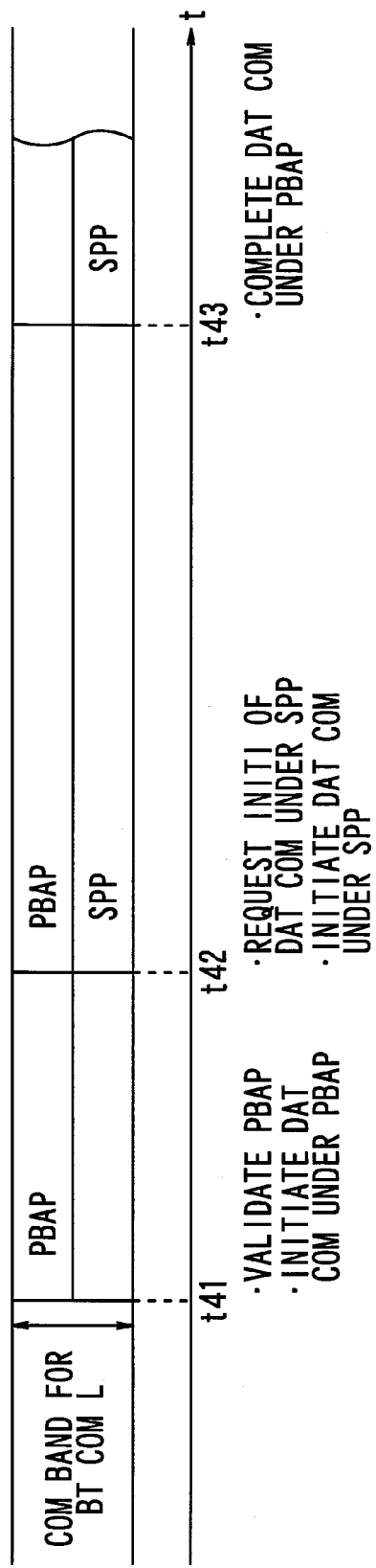
FIG. 11 is a diagram showing another transition of a communication band for a Bluetooth communication line.

As shown in FIG. 11, after the control unit 4 initiates data communication under PBAP (see t41), when the control unit 4 determines that an initiation request for data communication under SPP has been issued during execution of the data communication under PBAP, and determines that a communication band to be occupied by the data communication under SPP defining the data communication for which an initiation request has been issued does not exceed an unused communication band, the control unit 4 continues the data communication under PBAP defining the data communication that is being executed, and initiates the data communication under SPP (see t42). Thereafter, when the control unit 4 determines that the data communication under PBAP has been completed prior to completion of the data communication under SPP, the control unit 4 continues the data communication under SPP (see t43). Even in this case, since the data communication under PBAP that has been initiated previously is completed, the unused communication band is generated. Therefore, the control unit 4 may expand the communication band to be occupied by the data communication under SPP, and continue the data communication.

Next, referring to FIG. 12 to FIG. 14, a description will be made of a case where while data communication under a profile having a lower priority is being executed, an initiation request for data communication under a profile having a higher priority is issued.

Figure 12:
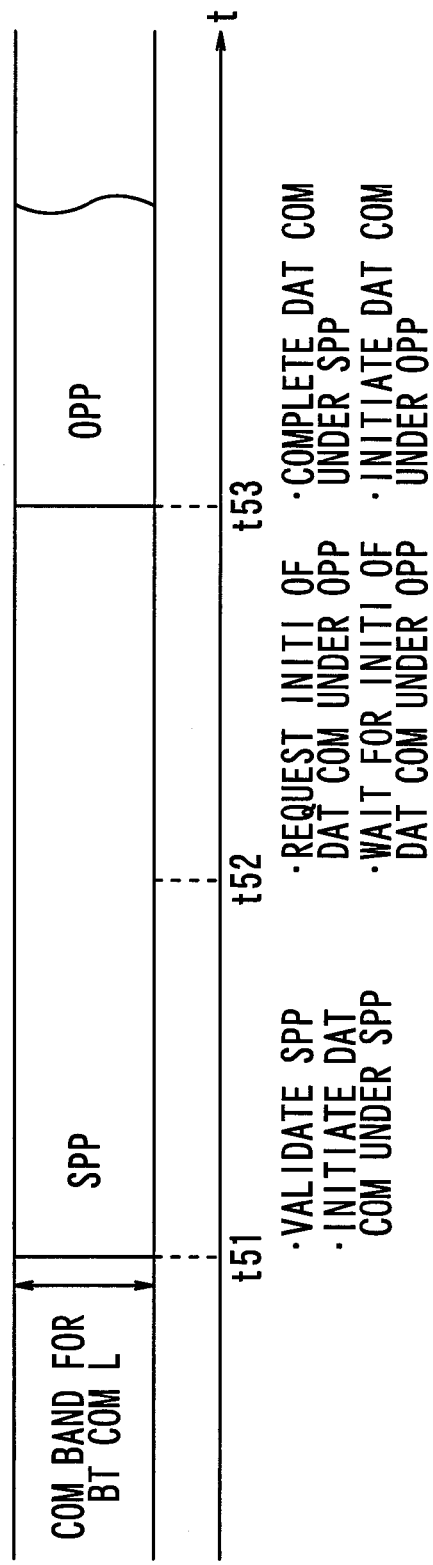
FIG. 12 is a diagram showing another transition of a communication band for a Bluetooth communication line.

As shown in FIG. 12, when the control unit 4 determines that, for example, a user has performed a predetermined manipulation at the operating unit 21, the control unit 4 initiates data communication under SPP (see t51). Herein, when the control unit 4 determines that an initiation request for data communication under OPP has been issued because the user has performed the predetermined manipulation at the operating unit 21 prior to completion of the data communication under SPP, that is, during execution of the data communication under SPP, and determines that a communication band to be occupied by the data communication under OPP defining the data communication for which an initiation request has been issued exceeds an unused communication band (the unused communication band is not found), the control unit 4 continues the data communication under SPP defining the data communication that is being executed, and waits for initiation of the data communication under OPP defining the data communication for which an initiation request has been issued (see t52). When the control unit 4 determines that the data communication under SPP has been completed, the control unit 4 initiates the data communication under OPP defining the data communication whose initiation has been waited (ceases waiting for initiation of the data communication) (see t53).

Figure 13:
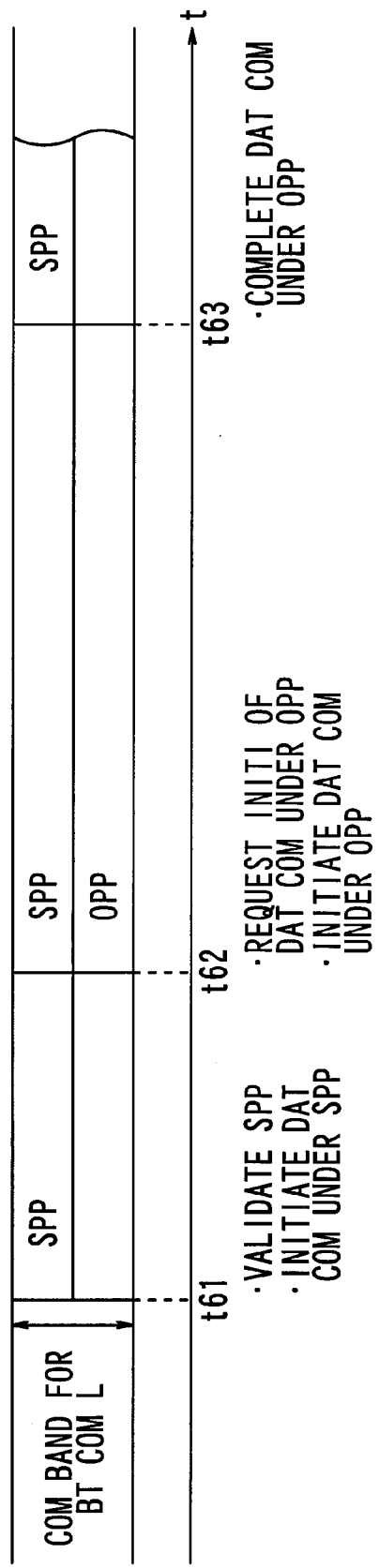
FIG. 13 is a diagram showing another transition of a communication band for a Bluetooth communication line.

As shown in FIG. 13, after the control unit 4 initiates data communication under SPP (see t61), when the control unit 4 determines that an initiation request for data communication under OPP has been issued during execution of the data communication under SPP, and determines that a communication band to be occupied by the data communication under OPP defining the data communication for which an initiation request has been issued does not exceed an unused communication band (an unused communication band is found), the control unit 4 continues the data communication under SPP defining the data communication that is being executed, and initiates the data communication under OPP (see t62). Thereafter, when the control unit 4 determines that the data communication under OPP has been completed prior to completion of the data communication under SPP, the control unit 4 continues the data communication under SPP (see t63).

As shown in FIG. 14, after the control unit 4 initiates data communication under SPP (see t71), when the control unit 4 determines that an initiation request for data communication under OPP has been issued during execution of the data communication under SPP, and determines that a communication band to be occupied by the data communication under OPP defining the data communication for which an initiation request has been issued does not exceed an unused communication band, the control unit 4 continues the data communication under SPP defining the data communication that is being executed, and initiates the data communication under OPP (see t72). Thereafter, when the control unit 4 determines that the data communication under SPP has been completed prior to completion of the data communication under OPP, the control unit 4 continues the data communication under OPP (see t73). In this case, since the data communication under SPP that has been initiated previously is completed, the unused communication band is generated. Therefore, the control unit 4 may expand the communication band to be occupied by the data communication under OPP, and continue the data communication.

As mentioned above, according to the present embodiment, in the onboard device 2, while data communication under PBAP having a lower priority is being executed, when an initiation request for data communication under SPP having a higher priority is issued and a communication band to be occupied by the data communication under SPP defining the data communication for which an initiation request has been issued exceeds an unused communication band, PBAP of the lower priority is invalidated and the data communication under PBAP is suspended. Otherwise, the communication band to be occupied by the data communication under PBAP is reduced, and the data communication under SPP of the higher priority is initiated. Therefore, the data communication under SPP of the higher priority can be executed in preference to the data communication under PBAP of the lower priority.

While data communication under SPP having a higher priority is being executed, when an initiation request for data communication under OPP having a lower priority is issued and a communication band to be occupied by the data communication under OPP, which defines the data communication for which an initiation request has been issued, exceeds an unused communication band, initiation of the data communication under OPP of the lower priority is waited (but the data communication is not initiated), and the data communication under SPP of the higher priority is continued. Therefore, even in this case, the data communication under SPP of the higher priority can be executed in preference to the data communication under OPP of the lower priority.

Specifically, when data communication under SPP is prioritized rather than data communication under any other profile, a response to a user manipulation can be immediately presented. A case where the data communication under SPP is prioritized rather than data communication under any other profile has been described so far. Assuming that data communication under HFP is prioritized rather than data communication under any other profile, when voice call termination at the portable cellular phone 3 over the communication network 33 takes place, data with which the portable cellular phone 3 notifies the onboard device 2 of the occurrence of voice call termination (voice call termination notification data) can be immediately transmitted from the Bluetooth module 5 to the Bluetooth module 24 under HFP. The onboard device 2 can immediately notify a user of the occurrence of voice call termination.

Assuming that data communication under MAP is prioritized rather than data communication under any other profile, when electronic mail termination at the portable cellular phone 3 over the communication network 33 takes place, data with which the portable cellular phone 3 notifies the onboard device 2 of the occurrence of electronic mail termination (electronic mail termination notification data) can be immediately transmitted from the Bluetooth module 5 to the Bluetooth module 24 under MAP. The onboard device 2 can immediately notify a user of the occurrence of electronic mail termination.

Further, assuming that data communication under DUN is prioritized rather than data communication under any other profile, data necessary to make a dial-up connection can be immediately transferred between the Bluetooth module 5 and Bluetooth module 24 under DUN. Besides, the dial-up connection can be immediately completed. In particular, under the pay-as-you-go system under which a user is charged according to a connection time of a wide-area communication line between the telephone communication unit 23 and communication network 33, when the dial-up connection can be immediately completed, an effect on a cost a user incurs can be expected.

The present disclosure is not limited to the aforesaid embodiment but may be modified or expanded as mentioned below.

A short range communication device is not limited to the onboard device 2. As long as a device includes a Bluetooth module having the same feature as the Bluetooth module 5, the device may be a navigation device having a known navigation feature, or a device that is not mounted in a vehicle. A communication-party device that is a data communication party of the short range communication device is not limited to the portable cellular phone 3. As long as a device includes a Bluetooth module having the same feature as the Bluetooth module 24, the device may be a handheld terminal or a fixed terminal which a user cannot carry with her/him.

The present disclosure is not limited to a case where data communications under two profiles compete with each other. The same applies to a case where data communications under three or more profiles compete with one another. Specifically, when data communications under three or more profiles compete with one another, other two or more profiles except a profile having a top priority may be invalidated in order to suspend the data communications under the other two or more profiles. Otherwise, a communication band to be occupied by the data communications under the other two or more profiles may be reduced, or initiation of the data communications under the other two or more profiles may be waited. Thus, the data communication under the profile having the top priority may be executed in preference to the data communications under the other two or more profiles.

For determining a priority of each profile, when the priority of, for example, PBAP or OPP is determined to be higher than the priorities of the other profiles, transfer of telephone directory data can be prioritized rather than an action defined by any other profile. When the priority of, for example, A2DP or AVRCP is determined to be higher than the priorities of the other profiles, transfer of sound data (tune data) stored in the portable cellular phone 3 can be prioritized rather than an action defined by any other profile.

A profile that defines the data communication which is being executed is invalidated in order to suspend data communication under the profile. Alternatively, while the profile defining the data communication which is being executed is kept validated (but is not invalidated), the data communication under the profile may be suspended, or the suspended data communication may be resumed.

Not only a user presets priorities of profiles but also the control unit 4 may dynamically determine the priorities. For example, assume that data communications under plural profiles that require different processing loads compete with one another. When a processing load required for processing other than the data communications falls below a predetermined level at the time of the competition of the data communications, if the data communications can still be fully dealt with, the priority of a profile that requires a larger processing load may be determined to be higher. When the processing load required for processing other than the data communications is equal to or larger than the predetermined level at the time of the competition of the data communications, if the data communications cannot be fully dealt with, the priority of a profile requiring a smaller processing load may be determined to be higher.

The above disclosure has the following aspects.

According to an aspect of the present disclosure, a short range wireless communication device includes: a connection unit that is concurrently connectable with an external connection unit according to a plurality of data communication protocols, each of which defines data communication under a condition that the connection unit connects with the external connection unit via a short range communication line covering a predetermined communication band; and a control unit that controls connection and disconnection of each of the data communication protocols between the connection unit and the external connection unit, and controls a part of the communication band in the short range communication line to be occupied by data communication under a corresponding data communication protocol. The plurality of data communication protocols includes a high priority data communication protocol corresponding to a high priority part of the communication band in the short range communication line and a low priority data communication protocol corresponding to a low priority part of the communication band in the short range communication line. When a request for concurrently executing data communications under the plurality of data communication protocols is issued, the control unit preserves the high priority part of the communication band in priority to the low priority part of the communication band so that the control unit executes high priority data communication under the high priority data communication protocol in priority to low priority data communication under the low priority data communication protocol.

In the above device, even when data communications under plural mutually different data communications protocols compete with one another, priorities are set for the plural mutually different data communications protocols. Data communication under a data communications protocol having a higher priority is executed in preference to data communication under a data communications protocol having a lower priority. Thus, the data communications under the plural mutually different data communications protocols can be effectively executed.

Alternatively, when the control unit determines that an initiation request for executing the high priority data communication is issued during execution of the low priority data communication, the control unit may suspend the low priority data communication, and initiates the high priority data communication. In this case, the data communication under the data communications protocol of the lower priority which defines the data communication that is being executed is suspended, and the data communication under the data communications protocol of the higher priority is initiated. Thus, the data communication under the data communications protocol of the higher priority can be executed in preference to the data communication under the data communications protocol of the lower priority.

Alternatively, when the control unit determines that the high priority data communication is completed after the control unit suspends the low priority data communication, and initiates the high priority data communication, the control unit may resume the low priority data communication. In this case, when the data communication under the data communications protocol of the higher priority is completed, the data communication under the data communications protocol of the lower priority is not left suspended but is resumed immediately.

Alternatively, when the control unit determines that an initiation request for executing the high priority data communication is issued during execution of the low priority data communication, the control unit may disconnect the low priority data communication protocol between the connection unit and the external connection unit so that the control unit suspends the low priority data communication, and initiates the high priority data communication. In this case, the data communications protocol of the lower priority which defines the data communication that is being executed is invalidated in order to suspend the data communication under the data communications protocol of the lower priority, and the data communication under the data communications protocol of the higher priority is initiated. Thus, the data communication under the data communications protocol of the higher priority is executed in preference to the data communication under the data communications protocol of the lower priority.

Alternatively, when the control unit determines that the high priority data communication is completed after the control unit disconnects the low priority data communication protocol so that the control unit suspends the low priority data communication, and initiates the high priority data communication, the control unit may reconnect the low priority data communication protocol between the connection unit and the external connection unit so that the control unit resumes the low priority data communication. In this case, when the data communication under the data communications protocol of the higher priority is completed, the data communication under the data communications protocol of the lower priority is not left suspended but is resumed immediately.

Alternatively, when the control unit determines that an initiation request for executing the high priority data communication is issued during execution of the low priority data communication, the control unit may reduce the low priority part of the communication band in the short range communication line, and initiate the high priority data communication so that the control unit concurrently executes both of the high priority data communication and the low priority data communication. In this case, a communication band for the short range communication line to be occupied by data communication under a data communications protocol of a lower priority which defines the data communication that is being executed is reduced, and data communication under a data communications protocol having a higher priority is initiated. Thus, the data communication under the data communications protocol of the lower priority and the data communication under the data communications protocol of the higher priority are executed concurrently. Eventually, the data communication under the data communications protocol of the higher priority can be executed in preference to the data communication under the data communications protocol of the lower priority. In addition, in this case, the data communications protocol of the lower priority which defines the data communication that is being executed is not invalidated, but the data communication is continued. This obviates the necessity of the processing of revalidating the data communications protocol of the lower priority so as to resume the data communication under the data communications protocol of the lower priority. Namely, as long as the data communications protocol of the lower priority is specified to resume the data communication with the leading data every time the data communications protocol is revalidated, the necessity of resuming the data communication with the leading data every time the data communications protocol is revalidated can be obviated.

Alternatively, when the control unit determines that the low priority data communication continues, and the high priority data communication is completed after the control unit reduces the low priority part of the communication band in the short range communication line, and initiates the high priority data communication so that the control unit concurrently executes both of the high priority data communication and the low priority data communication, the control unit may expand the low priority part of the communication band. In this case, since the communication band for the short range communication line to be occupied by the data communication under the data communications protocol of the lower priority is expanded, a period elapsing until the data communication under the data communications protocol of the lower priority is completed can be shortened.

Alternatively, when the control unit determines that the low priority data communication is completed, and the high priority data communication continues after the control unit reduces the low priority part of the communication band in the short range communication line, and initiates the high priority data communication so that the control unit concurrently executes both of the high priority data communication and the low priority data communication, the control unit expands the low priority part of the communication band, the control unit may expand the high priority part of the communication band. In this case, since the communication band for the short range communication line to be occupied by the data communication under the data communications protocol of the higher priority is expanded, a period elapsing until the data communication under the data communications protocol of the higher priority is completed can be shortened.

Alternatively, when the control unit determines that an initiation request for executing the low priority data communication is issued during execution of the high priority data communication, the control unit may continue to execute the high priority data communication, and stand by for initiation of the low priority data communication. In this case, the data communication under the data communications protocol of the higher priority which defines the data communication that is being executed is continued, and initiation of the data communication under the data communications protocol of the lower priority is waited. Therefore, the data communication under the data communications protocol of the higher priority can be executed in preference to the data communication under the data communications protocol of the lower priority.

Alternatively, when the control unit determines that the high priority data communication is completed after the control unit continues to execute the high priority data communication, and stands by for initiation of the low priority data communication, the control unit may initiate the low priority data communication. In this case, when the data communication under the data communications protocol of the higher priority is completed, initiation of the data communication under the data communications protocol of the lower priority is not left waited, but the data communication under the data communications protocol of the lower priority is immediately initiated.

Alternatively, the high priority data communication may include at least one of data communication concerning data corresponding to user manipulation, data communication concerning data representing a notification of incoming call at the external connection unit from an external communication network, and data communication concerning data that is necessary for the external connection unit to connect with the external communication network. In this case, when data communication concerning data responsive to a user manipulation is executed as data communication under a data communications protocol having a higher priority, the data communication concerning the data responsive to the user manipulation can be executed in preference to the other data communications. A response to the user manipulation can be immediately presented to a user. When data communication concerning data that represents a notification of call termination at a communication-party device over a communication network is executed as the data communication under the data communications protocol of the higher priority, the data communication concerning the data that represents the notification of call termination at the communication-party device over the communication network can be executed in preference to the other data communications. Eventually, a user can be immediately notified of the call termination over the communication network. When data communication concerning data necessary for the communication-party device to connect onto the communication network is executed as the data communication under the data communications protocol of the higher priority, the data communication concerning the data necessary for the communication-party device to connect onto the communication network can be executed in preference to the other data communications. For example, under a pay-as-you-go system under which a user is charged according to a time of a connection onto the communication network, when a connection onto the communication network is immediately completed, an effect on a cost the user incurs can be expected.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A short range wireless communication device comprising:
    a connection unit that is concurrently connectable with an external connection unit according to a plurality of data communication protocols, each of which defines data communication under a condition that the connection unit connects with the external connection unit via a short range communication line covering a predetermined communication band; and
    a control unit that controls connection and disconnection of each of the data communication protocols between the connection unit and the external connection unit, and controls a part of the communication band in the short range communication line to be occupied by data communication under a corresponding data communication protocol,
    wherein the plurality of data communication protocols includes a high priority data communication protocol corresponding to a high priority part of the communication band in the short range communication line and a low priority data communication protocol corresponding to a low priority part of the communication band in the short range communication line,
    wherein, when a request for concurrently executing data communications under the plurality of data communication protocols is issued, the control unit preserves the high priority part of the communication band in priority to the low priority part of the communication band so that the control unit executes high priority data communication under the high priority data communication protocol in priority to low priority data communication under the low priority data communication protocol;
    wherein the high priority data communication includes at least one of data communication concerning data corresponding to user manipulation, data communication concerning data representing a notification of incoming call at the external connection unit from an external communication network, and data communication concerning data that is necessary for the external connection unit to connect with the external communication network.

2. The short range communication device according to claim 1,
    wherein, when the control unit determines that an initiation request for executing the high priority data communication is issued during execution of the low priority data communication, the control unit suspends the low priority data communication, and initiates the high priority data communication.

3. The short range communication device according to claim 2,
    wherein, when the control unit determines that the high priority data communication is completed after the control unit suspends the low priority data communication, and initiates the high priority data communication, the control unit resumes the low priority data communication.

4. The short range communication device according to claim 2,
    wherein, when the control unit determines that an initiation request for executing the high priority data communication is issued during execution of the low priority data communication, the control unit disconnects the low priority data communication protocol between the connection unit and the external connection unit so that the control unit suspends the low priority data communication, and initiates the high priority data communication.

5. The short range communication device according to claim 4,
    wherein, when the control unit determines that the high priority data communication is completed after the control unit disconnects the low priority data communication protocol so that the control unit suspends the low priority data communication, and initiates the high priority data communication, the control unit reconnects the low priority data communication protocol between the connection unit and the external connection unit so that the control unit resumes the low priority data communication.

6. The short range communication device according to claim 1,
    wherein, when the control unit determines that an initiation request for executing the low priority data communication is issued during execution of the high priority data communication, the control unit continues to execute the high priority data communication, and stands by for initiation of the low priority data communication.

7. The short range communication device according to claim 6,
    wherein, when the control unit determines that the high priority data communication is completed after the control unit continues to execute the high priority data communication, and stands by for initiation of the low priority data communication, the control unit initiates the low priority data communication.

8. A short range wireless communication device comprising:
    a connection unit that is concurrently connectable with an external connection unit according to a plurality of data communication protocols, each of which defines data communication under a condition that the connection unit connects with the external connection unit via a short range communication line covering a predetermined communication band; and
    a control unit that controls connection and disconnection of each of the data communication protocols between the connection unit and the external connection unit, and controls a part of the communication band in the short range communication line to be occupied by data communication under a corresponding data communication protocol,
    wherein the plurality of data communication protocols includes a high priority data communication protocol corresponding to a high priority part of the communication band in the short range communication line and a low priority data communication protocol corresponding to a low priority part of the communication band in the short range communication line, wherein, when a request for concurrently executing data communications under the plurality of data communication protocols is issued, the control unit preserves the high priority part of the communication band in priority to the low priority part of the communication band so that the control unit executes high priority data communication under the high priority data communication protocol in priority to low priority data communication under the low priority data communication protocol;

wherein, when the control unit determines that an initiation request for executing the high priority data communication is issued during execution of the low priority data communication, the control unit reduces the low priority part of the communication band in the short range communication line, and initiates the high priority data communication so that the control unit concurrently executes both of the high priority data communication and the low priority data communication.

9. The short range communication device according to claim 8, wherein, when the control unit determines that the low priority data communication continues, and the high priority data communication is completed after the control unit reduces the low priority part of the communication band in the short range communication line, and initiates the high priority data communication so that the control unit concurrently executes both of the high priority data communication and the low priority data communication, the control unit expands the low priority part of the communication band.

10. The short range communication device according to claim 8, wherein, when the control unit determines that the low priority data communication is completed, and the high priority data communication continues after the control unit reduces the low priority part of the communication band in the short range communication line, and initiates the high priority data communication so that the control unit concurrently executes both of the high priority data communication and the low priority data communication, the control unit expands the low priority part of the communication band, the control unit expands the high priority part of the communication band.

11. A short range wireless communication device comprising:

a connection unit that is concurrently connectable with an external connection unit according to a plurality of data communication protocols, each of which defines data communication under a condition that the connection unit connects with the external connection unit via a short range communication line covering a predetermined communication band; and a control unit that controls connection and disconnection of each of the data communication protocols between the connection unit and the external connection unit, and controls a part of the communication band in the short range communication line to be occupied by data communication under a corresponding data communication protocol, wherein the plurality of data communication protocols includes a high priority data communication protocol corresponding to a high priority part of the communication band in the short range communication line and a low priority data communication protocol corresponding to a low priority part of the communication band in the short range communication line, wherein, when a request for concurrently executing data communications under the plurality of data communication protocols is issued, the control unit preserves the high priority part of the communication band in priority to the low priority part of the communication band so that the control unit executes high priority data communication under the high priority data communication protocol in priority to low priority data communication under the low priority data communication protocol, and wherein the control unit dynamically determines priorities of the data communication protocols such that:

when multiple data communications compete with each other, and a processing load required for a process other than multiple data communications is smaller than a predetermined level, a priority of a data communication protocol that requires a larger processing load for a data communication is determined to be higher, and when multiple data communications compete with each other, and a processing load required for a process other than multiple data communications is equal to or larger than a predetermined level, a priority of a data communication protocol that requires a smaller processing load for a data communication is determined to be higher.

* * * * *